United States Patent
Zhou et al.

(10) Patent No.: US 9,046,950 B1
(45) Date of Patent: Jun. 2, 2015

(54) TOUCH DISPLAY PANEL WITH ELECTROSTATIC PROTECTION UNIT

(71) Applicants: Shanghai Tianma Micro-Electronics Co., Ltd., Shanghai (CN); Tianma Micro-Electronics Co., Ltd., Shenzhen (CN)

(72) Inventors: Xingyao Zhou, Shanghai (CN); Qijun Yao, Shanghai (CN); Huiping Chai, Shanghai (CN); Zhongshou Huang, Shanghai (CN)

(73) Assignees: Shanghai Tianma Micro-Electronics Co., Ltd., Shanghai (CN); Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 14/283,133

(22) Filed: May 20, 2014

(30) Foreign Application Priority Data

Dec. 23, 2013 (CN) .......................... 2013 1 0718974

(51) Int. Cl.
*G06F 3/041* (2006.01)
*G02F 1/1333* (2006.01)
*G02F 1/1362* (2006.01)

(52) U.S. Cl.
CPC .............. *G06F 3/041* (2013.01); *G06F 3/0412* (2013.01); *G02F 1/13338* (2013.01); *G02F 1/136204* (2013.01)

(58) Field of Classification Search
CPC .......... G02F 1/136204; G02F 1/13338; G06F 3/0412
See application file for complete search history.

(56) References Cited

U.S. PATENT DOCUMENTS

2014/0092510 A1* 4/2014 Huang ........................... 361/56

FOREIGN PATENT DOCUMENTS

| JP | 2011003025 A | 1/2011 |
|---|---|---|
| KR | 1020110000985 A | 1/2011 |
| KR | 1020110041109 A | 4/2011 |
| KR | 1020110066450 A | 6/2011 |

OTHER PUBLICATIONS

International Search Report as issued in International Application PCT/KR2012/005613 on Jan. 24, 2013 (Published as WO 2013/012216 A3).

* cited by examiner

*Primary Examiner* — Evan Pert
(74) *Attorney, Agent, or Firm* — Kilpatrick Townsend & Stockton LLP

(57) ABSTRACT

A touch display panel and a display device with the same includes driving electrodes, sensing electrodes insulated from each other, driving electrode leads, sensing electrode leads, first external terminals and second external terminals, all disposed on the color filter substrate. The driving electrodes are respectively connected with the first external terminals by the driving electrode leads, the sensing electrodes are respectively connected with the second external terminals by the sensing electrode leads; third external terminals on a TFT array substrate respectively correspond to and are electrically connected with the first external terminals, fourth external terminals on the TFT array substrate respectively correspond to and are electrically connected with the second external terminals; the third external terminals and the fourth external terminals are connected with a common electrode line through an electrostatic protection unit, thereby protecting the driving electrodes and the sensing electrodes against electrostatic discharge.

16 Claims, 8 Drawing Sheets

TOUCH DISPLAY PANEL WITH ELECTROSTATIC PROTECTION UNIT

CROSS-REFERENCES TO RELATED APPLICATIONS

This application claims the benefit of priority to Chinese Patent Application No. 201310718974.9, filed with the Chinese Patent Office on Dec. 23, 2013 and entitled "TOUCH DISPLAY PANEL AND DISPLAY DEVICE WITH THE SAME", the content of which is incorporated herein by reference in its entirety.

FIELD OF THE INVENTION

The present invention relates to the field of display technologies, in particular to a touch display panel and a display device with the same.

BACKGROUND OF THE INVENTION

An Electrostatic Discharge (ESD) event is a high energy pulse that can break through a semiconductor device or generate sufficient heat to melt the semiconductor device. In the case of damage caused by imperceptible degradation or malfunction of parts of components of the semiconductor device, there will be substantial economic losses. Therefore, an ESD event will cause fatal damage to electronic products; it not only degrades the reliability of the electronic products, but also increases maintenance costs Annual damages due to electrostatic discharge are estimated to cause a loss of billions of dollars to the electronics manufacturing industry.

BRIEF SUMMARY OF THE INVENTION

Embodiments of the present invention provide a touch display panel and a display device with the same to solve technical problems in the prior art that the product yield is reduced and driving electrodes and sensing electrodes are damaged due to the electrostatic discharge.

In a first aspect, the embodiment of the present invention provides a touch display panel which includes:

a color filter substrate;

a TFT array substrate disposed opposite to the color filter substrate;

a plurality of driving electrodes, and a plurality of sensing electrodes electrically insulated from the driving electrodes, wherein the plurality of driving electrodes and the plurality of sensing electrodes are disposed on the color filter substrate;

a plurality of driving electrode leads, a plurality of sensing electrode leads, a plurality of first external terminals and a plurality of second external terminals, all disposed on the color filter substrate, where the driving electrodes are respectively connected with the first external terminals by the driving electrode leads, and the sensing electrodes are respectively connected with the second external terminals by the sensing electrode leads;

a plurality of third external terminals and a plurality of fourth external terminals, both disposed on the TFT array substrate, where the third external terminals respectively correspond to and are electrically connected with the first external terminals, and the fourth external terminals respectively correspond to and are electrically connected with the second external terminals;

a common electrode line disposed on the TFT array substrate; and an electrostatic protection unit disposed on the TFT array substrate, with the third external terminals and the fourth external terminals being connected with the common electrode line through the electrostatic protection unit.

In a second aspect, an embodiment of the present invention also provides a display device with a touch display panel, and the touch display panel is one as provided in the first aspect as above.

In the touch display panel and the display device with the same as provided by the embodiments of the present invention, the active electrostatic protection unit is provided on the TFT array substrate, the input end of the electrostatic protection unit is connected with the driving electrodes and the sensing electrodes arranged on the color filter substrate, and the output end of the electrostatic protection unit is connected with the common electrode line arranged on the TFT array substrate, to protect the driving electrodes and the sensing electrodes against the ESD, thereby improving the yield of the display device with a touch display panel.

BRIEF DESCRIPTION OF THE DRAWINGS

Other features, objects and advantages of the present invention will become more apparent from the detailed description for non-limiting embodiments made with reference to the accompany drawings, in which.

DETAILED DESCRIPTION OF THE INVENTION

The present invention will be further described in detail below in conjunction with the accompanying drawings and embodiments. It should be noted that the specific embodiments of the present invention disclosed herein are illustrative and not restrictive. It also is to be understood that the accompanying drawings shows only parts relating to the present invention, but not in an exhausting way, for the ease of description.

With the existing In-Cell Touch Panel (In-Cell TP) technology, driving electrodes and sensing electrodes serving for a touch function are integrated on the side of a color filter substrate using a design of a touch pattern to form a touch panel. In an actual manufactured touch panel, the driving electrodes and the sensing electrodes can be disposed in the same conductive layer or two different conductive layers of the color filter substrate. However, a conductive layer provided for the touch functionality is susceptible to electrostatic discharge or can even be damaged by an electrostatic discharge event. Thus, such conductive layer adversely affects the color filter substrate compared with a color filter substrate without touch functionality. Unlike a Thin Film Transistor (TFT) array substrate, it is not possible to provide an active device for protecting the driving electrodes or the sensing electrodes against electrostatic discharge in the case of the color filter substrate, due to the structural characteristics of the color filter substrate. Thus, during the actual production of a display device with a touch display panel, in stages where static electricity is likely generated, such as a stage of forming an oriented film and a stage of injecting liquid crystals, electrostatic discharge would very likely occur between the driving electrodes and the sensing electrodes and hence cause a short circuit of the driving electrodes or the sensing electrodes or damage the driving electrodes or the sensing electrodes, thereby reducing the yield of the display device with a touch display panel.

Figure 1A:
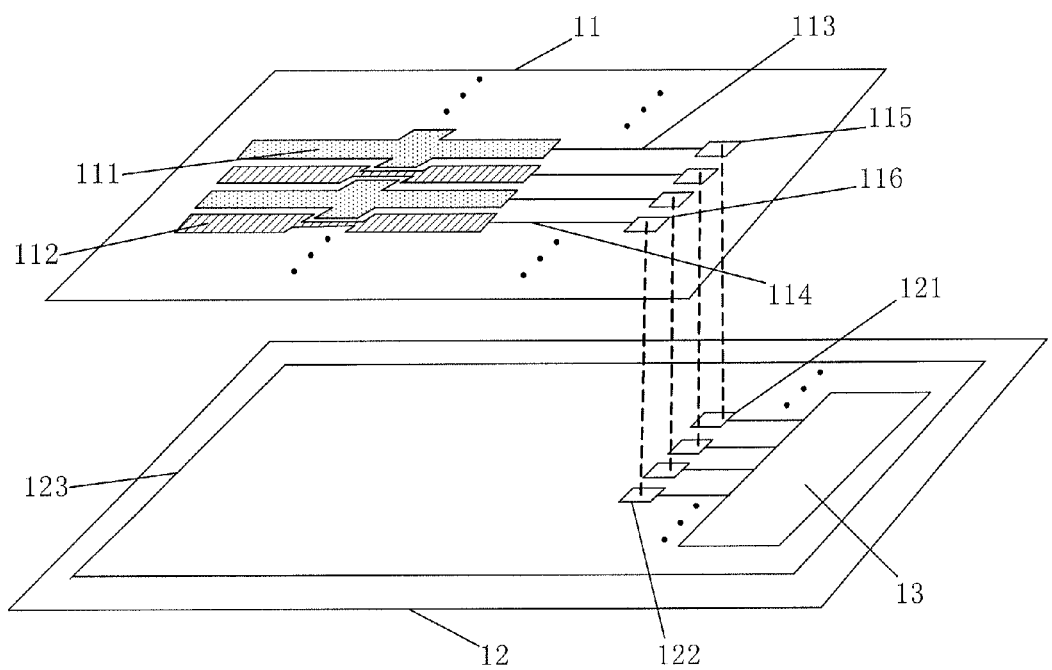
FIG. 1A is a schematic diagram of a structure of a touch display panel according to an embodiment of the present invention.

FIG. 1A is a schematic diagram of a structure of a touch display panel according to an embodiment of the present invention. As shown in FIG. 1A, the touch display panel includes: a color filter substrate 11; a TFT array substrate 12 disposed opposite to the color filter substrate 11; a plurality of driving electrodes 111, and a plurality of sensing electrodes 112 electrically insulated from the driving electrodes 111 and located in the same layer with the driving electrodes 111, with both the plurality of driving electrodes 111 and the plurality of sensing electrodes 112 being disposed on the color filter substrate 11; a plurality of driving electrode leads 113, a plurality of sensing electrode leads 114. The touch display panel also includes a plurality of first external terminals 115 and a plurality of second external terminals 116, all disposed on the color filter substrate, where the driving electrodes 111 are respectively connected with the first external terminals 115 by the driving electrode leads 113, and the sensing electrodes 112 are respectively connected with the second external terminals 116 by the sensing electrode leads 114; a plurality of third external terminals 121 and a plurality of fourth external terminals 122, both disposed on the TFT array substrate 12, where the third external terminals 121 respectively correspond to and are electrically connected with the first external terminals 115 (as indicated by the broken lines between the first external terminals 115 and the third external terminals 121 in FIG. 1a), and the fourth external terminals 122 respectively correspond to and are electrically connected with the second external terminals 116 (as indicated by the broken lines between the second external terminals 116 and the fourth external terminals 122 in FIG. 1A). The touch display panel further includes a common electrode line 123 disposed on the TFT array substrate 12; and an electrostatic protection unit 13 disposed on the TFT array substrate 12, with the third external terminals 121 and the fourth external terminals 122 being connected with the common electrode line 123 through the electrostatic protection unit 13, here, the connection between the electrostatic protection unit 13 and the common electrode line 123 is not shown in FIG. 1A.

Figure 1B:
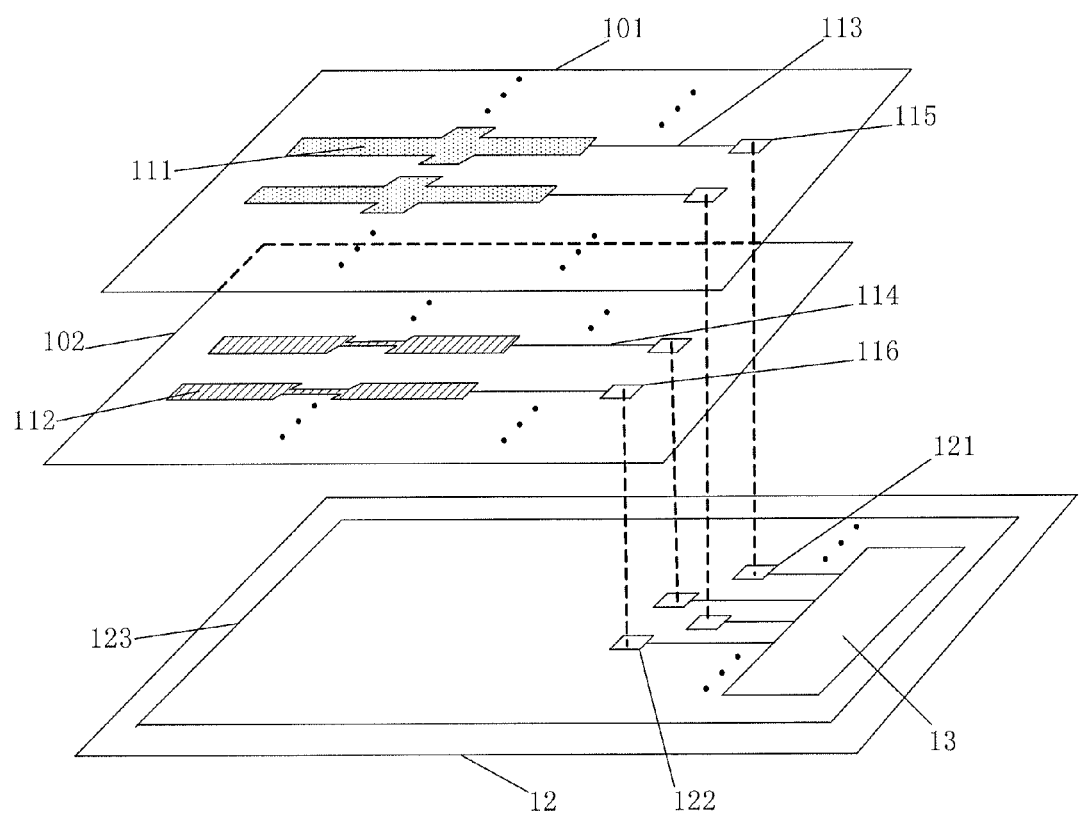
FIG. 1B is a schematic diagram of a structure of the touch display panel according to another embodiment of the present invention.

FIG. 1B is a schematic diagram of a structure of a touch display panel according to another embodiment of the present invention. The structure shown in FIG. 1B is different from that of FIG. 1A in that the plurality of driving electrodes 111 are located on a first conductive layer 101, the plurality of sensing electrodes 112 are located on a second conductive layer 102, where the first conductive layer 101 and the second conductive layer 102 are both located on the color filter substrate (not shown in FIG. 1B), and an insulating layer (not shown in FIG. 1B) is disposed between the first conductive layer 101 and the second conductive layer 102. Correspondingly, the plurality of driving electrodes leads 113 and the plurality of first external terminals 115 are both located on the first conductive layer 101, and the plurality of sensing electrodes 114 and the plurality of second external lead terminals 116 are both located on the second conductive layer 102, where the driving electrodes 111 are respectively connected with the first external terminals 115 by the driving electrode leads 113, and the sensing electrodes 112 are respectively connected with the second external terminals 116 via the sensing electrode leads 114. The first external terminals 115 and the second external terminals 116 are respectively connected with corresponding external terminals on the TFT array substrate 12 to be connected to the electrostatic protection unit 13, similar to the description provided with reference to FIG. 1A, and thus will not be repeated herein for the sake of brevity.

It should be noted that, since a color resistance layer is electrically insulating and typically disposed between a first conductive layer and a second conductive layer, the insulating layer disposed between the first conductive layer 101 and the second conductive layer 102 may be a color resistance layer.

Further, the common electrode line 123 may be made of a transparent conductive material such as indium zinc oxide, indium tin oxide, or a combination thereof. Such common electrode line may extend across the whole TFT array substrate, and thus has a large surface area to facilitate the connection with the electrostatic protection unit. Further, in the case of the same amount of charges, a larger surface area of the common electrode line means a lower surface charge density on the surface of the common electrode line, thus, the common electrode line obtains a strong charge endurance of. In addition, the potential of the common electrode line is low, which is advantageous for the release of electrostatic charges by the electrostatic protection unit.

In a specific example embodiment of the present invention, the first external terminals 115 are electrically connected with the third external terminals 121 by Anisotropic Conductive Films (ACFs), and likewise the second external terminals 116 are electrically connected with the fourth external terminals 122 by ACFs. The ACF has a good electrical conductivity and has a capability of anisotropic electrical conduction, and thus allows the first external terminal 115 and the second external terminal 116 to be respectively electrically connected with the third external terminal 121 and the fourth external terminal 122 in a direction perpendicular to the color filter substrate 11 and the TFT array substrate 12, and insulated from each other in a direction parallel to the color filter substrate 11 and the TFT array substrate 12.

Figure 2A:
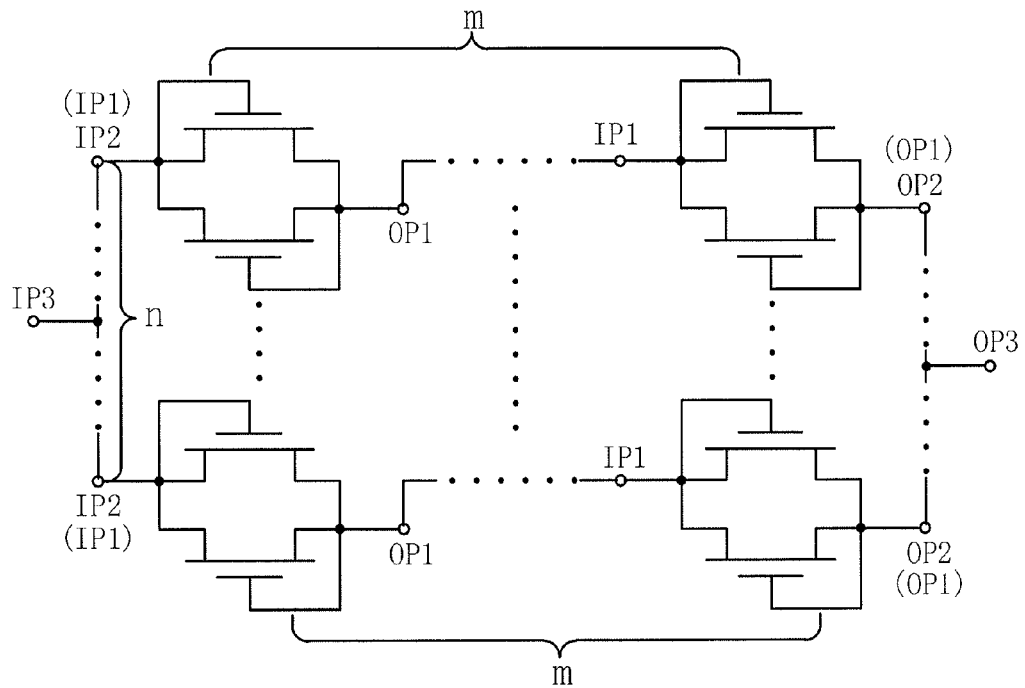
FIG. 2A is a first circuit diagram of an electrostatic protection unit of the touch display panel according to an embodiment of the present invention.
Figure 2B:
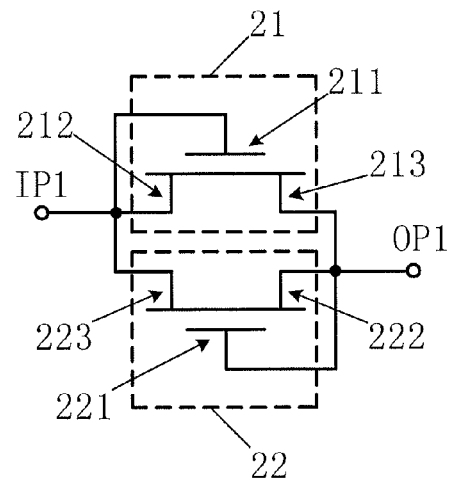
FIG. 2B is a circuit diagram of a pair of TFTs of the electrostatic protection unit in FIG. 2A.

FIG. 2A is a first circuit diagram of the electrostatic protection unit of the touch display panel according to an embodiment of the present invention. FIG. 2B is a circuit diagram of a pair of TFTs of the electrostatic protection unit in FIG. 2A. In one specific example embodiment of the present invention, referring to FIG. 2A, the electrostatic protection unit includes an array of n rows and m columns of TFTs, with each row including m pairs of TFTs connected in parallel with each other. Thus, the electrostatic protection unit includes a total of n×2 m TFTs, where n and m are positive integers.

Referring to FIG. 2B, each of the pairs of TFTs includes a first TFT 21 and a second TFT 22, where a gate electrode 211 of the first TFT 21, a drain electrode 212 of the first TFT 21 and a source electrode 223 of the second TFT 22 are connected together at a joint which functions as an input end IP1 of this pair of TFTs, while a gate electrode 221 of the second TFT 22, a drain electrode 222 of the second TFT 22 and a source electrode 213 of the first TFT 21 are connected together at a joint which functions as an output end OP1 of this pair of TFTs.

Referring to FIG. 2A, in each of the n rows of TFTs, the input end IP1 of each pair of TFTs except for the first pair of TFTs in this row is connected with the output end OP1 of the preceding pair of TFTs, the input end IP1 of the first pair of TFTs functions as an input end IP2 of this row of TFTs, and the output end OP1 of the m-th pair of TFTs in this row functions as an output end OP2 of this row of TFTs.

For example, referring to FIG. 2A, in each of the n rows of TFTs, the input end IP1 of the first pair of TFTs functions as an input end IP2 of this row of TFTs, the input end IP1 of the i-th subsequent pair of TFTs is connected with the output end OP1 of the preceding (i−1)-th pair of TFTs, and the output end OP1 of the m-th pair of TFTs in this row functions as an output end OP2 of this row of TFTs, where i denotes any positive integer larger than 1 and less than or equal to m.

All the input ends IP2 of the TFTs in the above n rows are connected together at a joint which functions as an input end IP3 of the electrostatic protection unit, and all the output ends OP2 of the TFTs in the above n rows are connected together at a joint which functions as an output end OP3 of the electrostatic protection unit.

The input end IP3 of the electrostatic protection unit is connected to the third external terminals 121 and the fourth external terminals 122, and the output end OP3 of the electrostatic protection unit is connected to the common electrode line 123.

As such, since each of the above n rows of TFTs includes m pairs of TFTs, if positive electrostatic charges are present at the input end IP3 of the electrostatic protection unit, only when an electrostatic voltage applied between the input end IP3 and the output end OP3 of the electrostatic protection unit reaches m times of a turning-on threshold voltage of the TFT, m forwardly connected TFTs in each of the above n rows (hereinafter, the m forwardly connected TFTs in each row are such that, the gate electrode and the drain electrode of each of the m forwardly connected TFTs except for the first one of the m forwardly connected TFTs are connected to the source electrode of the preceding TFT, the gate and drain electrodes of the first TFT are connected to the input end of the electrostatic protection unit, and the source electrode of the m-th TFT is connected to the output end of the electrostatic protection unit) are all turned on, so that a conductive path for releasing the positive electrostatic charges is formed between the input end IP3 and the output end OP3 of the electrostatic protection unit, thus achieving an effect of electrostatic protection. Similarly, if negative electrostatic charges are present at the input end IP3 of the electrostatic protection unit, only when an electrostatic voltage applied between the input end IP3 and the output end OP3 of the electrostatic protection unit reaches m times of a turning-on threshold voltage of the TFT, m reversely connected TFTs in each of the above n rows (hereinafter, the m reversely connected TFTs in each row are such that, the source electrode of each of m reversely connected TFTs except for the first one of the m reversely connected TFTs is connected to the gate and drain electrodes of the preceding TFT, the source electrode of the first TFT is connected to the input end of the electrostatic protection unit, and the gate and drain electrodes of the m-th TFT are connected to the output end of the electrostatic protection unit) are all turned on, so that the conductive path for releasing the negative electrostatic charges is formed between the input end IP3 and the output end OP3 of the electrostatic protection unit, thus protecting the driving electrodes and the sensing electrodes against electrostatic discharge. As such, the electrostatic protection unit is at its conductive state only if the applied electrostatic voltage is m times of the turning-on threshold voltage of the TFT, and hence can endure a high electrostatic voltage. In addition, once the electrostatic protection unit is at its conductive state, the formed conductive path includes n parallel rows of TFTs (with each row of TFTs containing m TFTs that are turned on), thus the electrostatic protection unit at its conductive state can endure a high conductive current because of the current division by the parallel circuits.

Figure 3:
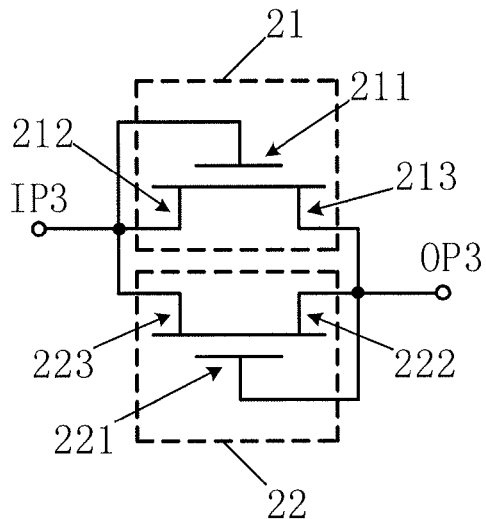
FIG. 3 is a circuit diagram of a first specific implementation of the electrostatic protection unit in FIG. 2A.

Further, several specific implementations of the electrostatic protection unit in FIG. 2A are given below in conjunction with FIGS. 3 to 5. FIG. 3 is a circuit diagram of a first specific implementation of the electrostatic protection unit in FIG. 2A. Referring to FIG. 3, the electrostatic protection unit includes a pair of TFTs including a first TFT 21 and a second TFT 22, a gate electrode 211 of the first TFT 21, a drain electrode 212 of the first TFT 21 and a source electrode 223 of the second TFT 22 are connected together at a joint which functions as the input end IP3 of the electrostatic protection unit, and a gate electrode 221 of the second TFT 22, a drain electrode 222 of the second TFT 22 and a source electrode 213 of the first TFT 21 are connected together at a joint which functions as the output end OP3 of the electrostatic protection unit. The input end IP3 of the electrostatic protection unit is connected to the third external terminals 121 and the fourth external terminals 122, and the output end OP3 of the electrostatic protection unit is connected to the common electrode line 123.

The electrostatic protection unit shown in FIG. 3 is a simple structure formed by a pair of TFTs (a basic unit) of the electrostatic protection unit shown in FIG. 2A. Because the generated electrostatic charges may be positive or negative, forwardly connected TFTs are required for releasing the positive electrostatic charges, and reversely connected TFTs are required for releasing the negative electrostatic charges, a structure having a function of electrostatic protection at least includes one forwardly connected TFT and one reversely connected TFT which are connected in parallel. As for the electrostatic protection unit in FIG. 3, when the potential at the input end IP3 of the electrostatic protection unit is higher than the potential at the output end OP3 of the electrostatic protection unit by the electrostatic voltage which reaches the turning-on threshold voltage of the TFT, the forwardly connected TFT is turned on, or when the potential at the output end OP3 of the electrostatic protection unit is higher than the potential at the input end IP3 of the electrostatic protection unit by an electrostatic voltage which reaches the turning-on threshold voltage of the TFT, the reversely connected TFTs is turned on, a conductive path for releasing electrostatic charges is formed between the input end IP3 and the output end OP3 of the electrostatic protection unit, thus protecting the driving electrodes and the sensing electrodes against electrostatic discharge.

Figure 4:
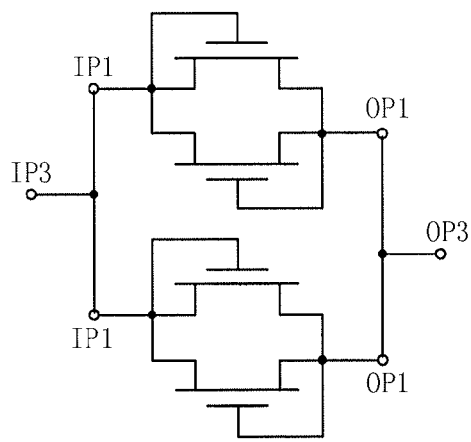
FIG. 4 is a circuit diagram of a second specific implementation of the electrostatic protection unit in FIG. 2A.

FIG. 4 is a circuit diagram of a second specific implementation of the electrostatic protection unit in FIG. 2A. Referring to FIG. 4, the electrostatic protection unit includes two pairs of TFTs connected in parallel. The input ends IP1 of the two pairs of TFTs are connected together at a joint which functions as the input end IP3 of the electrostatic protection unit, and the output ends OP1 of the two pairs of TFTs are connected together at a joint which functions as the output end OP3 of the electrostatic protection unit. The input end IP3 of the electrostatic protection unit is connected to the third external terminals 121 and the fourth external terminals 122, and the output end OP3 of the electrostatic protection unit is connected to the common electrode line 123.

As for the electrostatic protection unit in FIG. 4, when the electrostatic voltage reaches the turning-on threshold voltage of the TFT, two parallelly connected rows of TFTs are turned on simultaneously, where only one TFT is included in each of these two rows of TFTs. Thus, when a conductive path for releasing electrostatic charges is formed in electrostatic protection unit in FIG. 4, the electrostatic protection unit in FIG. 4 can endure a current twice as that in the case of the electrostatic protection unit in FIG. 3, to better protect the driving electrodes and the sensing electrodes against electrostatic discharge.

Figure 5:
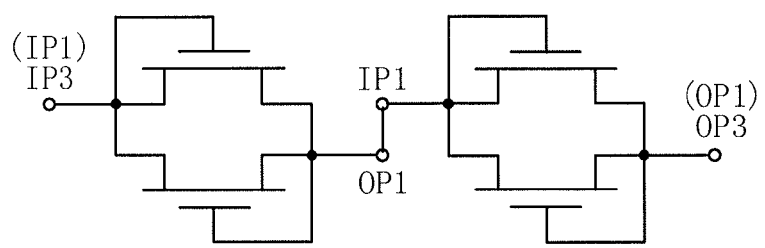
FIG. 5 is a circuit diagram of a third specific implementation of the electrostatic protection unit in FIG. 2A.

FIG. 5 is a circuit diagram of a third specific implementation of the electrostatic protection unit in FIG. 2A. Referring to FIG. 5, as the third specific implementation of the electrostatic protection unit in FIG. 2A, the electrostatic protection unit includes two serially connected pairs of TFTs. The input end IP1 of the first pair of TFTs functions as the input end IP3 of the electrostatic protection unit, the output end OP1 of the first pair of TFTs is connected to the input end IP1 of the second pair of TFTs, and the output end OP1 of the second pair of TFTs functions as the output end OP3 of the electrostatic protection unit. The input end IP3 of the electrostatic protection unit is connected to the third external terminals 121 and the fourth external terminals 122, and the output end OP3 of the electrostatic protection unit is connected to the common electrode line 123.

As for the electrostatic protection unit in FIG. 5, when the electrostatic voltage reaches two times the turning-on threshold voltage of the TFT, two TFTs in the same row are turned on. Thus, when a conductive path for releasing the electrostatic charges is formed, the electrostatic protection unit can endure an electrostatic voltage twice that in the case of the electrostatic unit in FIG. 3, to better protect the driving electrodes and the sensing electrodes against electrostatic discharge.

Figure 6A:
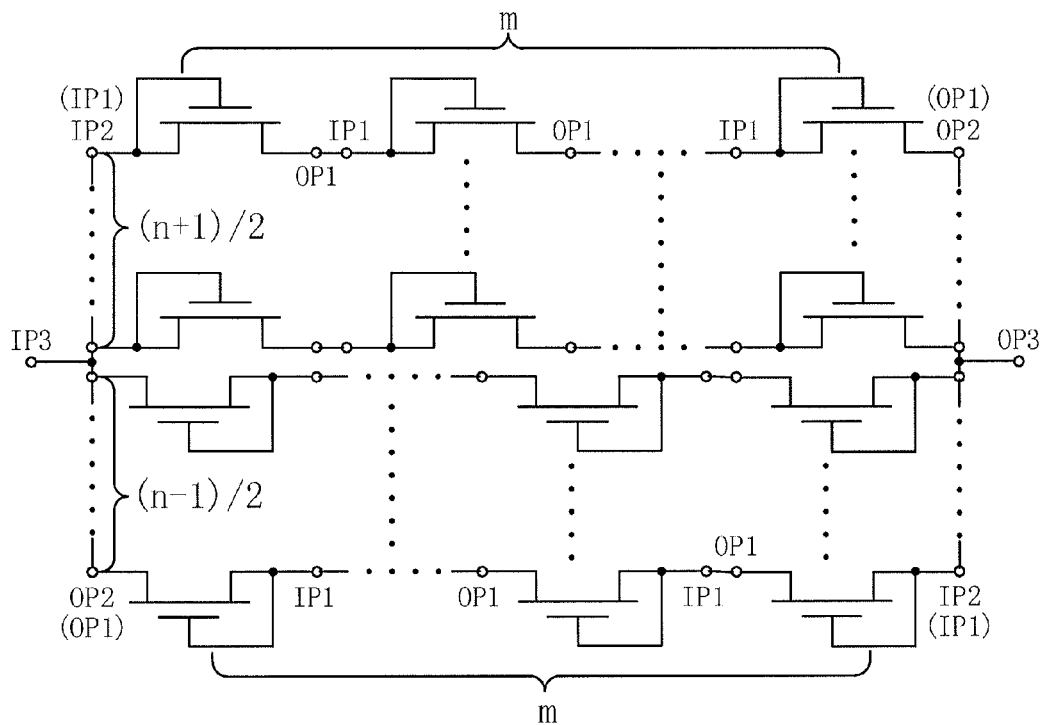
FIG. 6A is a second circuit diagram of the electrostatic protection unit of the touch display panel according to an embodiment of the present invention.
Figure 6B:
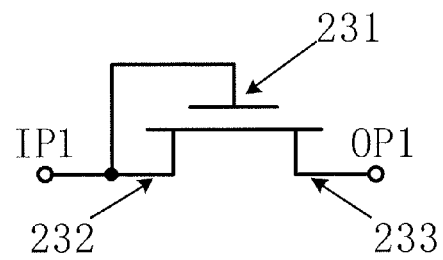
FIG. 6B is a circuit diagram of one of the TFTs of the electrostatic protection unit in FIG. 6A.

FIG. 6A is a second circuit diagram of the electrostatic protection unit of the touch display panel according to an embodiment of the present invention. FIG. 6B is a circuit diagram of one of the TFTs in the electrostatic protection unit in FIG. 6A. In one specific example of the present invention, referring to FIG. 6A, the electrostatic protection unit includes n parallelly connected rows of TFTs, with each row including m serially connected TFTs, so that the electrostatic protection unit comprises n×m TFTs, where n is an odd number greater than 1 and m is a positive integer.

Referring to FIG. 6B, a gate electrode 231 and a drain electrode 232 of each TFT are connected together at a joint which functions as an input end IP1 of the TFT, and a source electrode 233 of each TFT functions as an output end OP1 of the TFT.

Referring to FIG. 6A, in each of the n rows of TFTs, the input end IP1 of each TFT except for the first TFT in the row is connected with the output end OP1 of the preceding TFT, the input end IP1 of the first TFT functions as the input end IP2 of the row of TFTs, and the output end OP1 of the m-th TFT functions as an output end OP2 of the row of TFTs.

The input ends IP2 of the first (n+1)/2 rows of TFTs and the output ends OP2 of the remaining (n−1)/2 rows of TFTs are connected together at a joint which functions as the input end IP3 of the electrostatic protection unit, and the output ends OP2 of the first (n+1)/2 rows of TFTs and the input ends IP2 of the remaining (n−1)/2 rows of TFTs in are connected together at a joint which functions as the output end OP3 of the electrostatic protection unit.

The input end IP3 of the electrostatic protection unit is connected to the third external terminals 121 and the fourth external terminals 122, and the output end OP3 of the electrostatic protection unit is connected to the common electrode line 123.

The principle of implementing the electrostatic protection by the electrostatic protection unit in FIG. 6A is similar with that in FIG. 2A, and thus will not be discussed again here.

Figure 7:
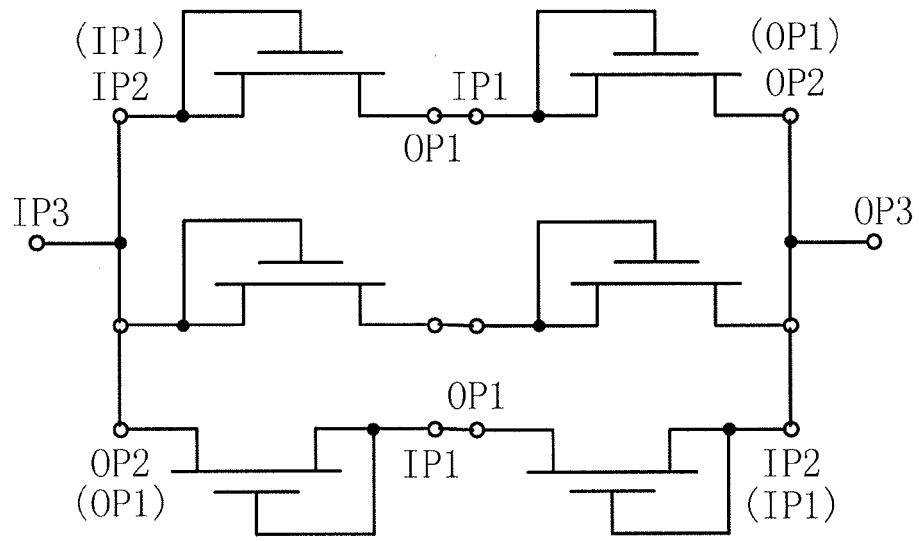
FIG. 7 is a circuit diagram of a specific implementation of the electrostatic protection unit in FIG. 6A.

Further, a specific implementation of the electrostatic protection unit in FIG. 6A is given below in connection with FIG. 7. FIG. 7 is a circuit diagram of a specific implementation of the electrostatic protection unit in FIG. 6A. Referring to FIG. 7, the electrostatic protection unit includes three parallelly connected rows of TFTs, with each row including two serially connected TFTs. In each of the three rows of TFTs, the input end IP1 of the first TFT functions as an input end IP2 of the row of TFTs, the output end OP1 of the first TFT is connected with the input end IP1 of the second TFT, and the output end OP1 of the second TFT functions as an output end OP2 of the row of TFTs.

The input ends IP2 of the first two rows of TFTs and the output end OP2 of the last row of TFTs are connected together at a joint which function as the input end IP3 of the electrostatic protection unit, and output ends OP2 of the first two rows of TFTs and the input end IP2 of the last row of TFTs are connected together at a joint which functions as the output end OP3 of the electrostatic protection unit. The input end IP3 of the electrostatic protection unit is connected with the third external terminals 121 and the fourth external terminals 122, and the output end OP3 of the electrostatic protection unit is connected with the common electrode line 123.

Figure 8:
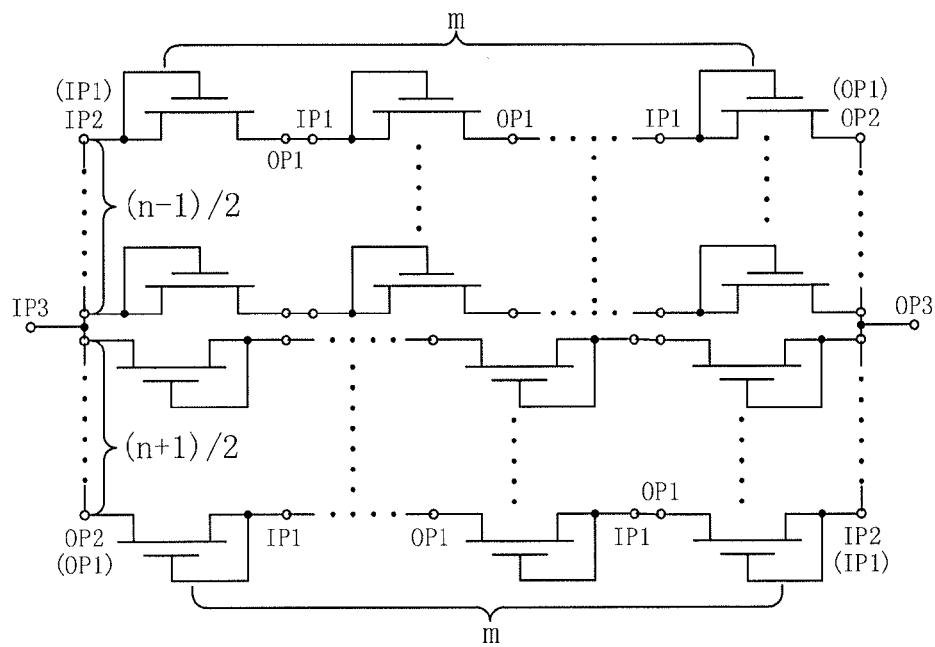
FIG. 8 is a third circuit diagram of the electrostatic protection unit of the touch display panel according to an embodiment of the present invention.

FIG. 8 is a third circuit diagram of the electrostatic protection unit of the touch display panel according to an embodiment of the present invention. In a specific example of the present invention, as shown in FIG. 8, the number of rows of forwardly connected TFTs and the number of rows of reversely connected TFTs in the electrostatic protection unit in FIG. 8 are respectively equal to the number of rows of the reversely connected TFTs and the number of rows of the forwardly connected TFTs in the electrostatic protection unit in FIG. 6A, that is, in the electrostatic protection unit, the input ends IP2 of the first (n−1)/2 rows of TFTs and the output ends OP2 of the remaining (n+1)/2 rows of TFTs are connected together at a joint which functions as the input end IP3 of the electrostatic protection unit, and the output ends OP2 of the first (n−1)/2 rows of TFTs and the input ends IP2 of the remaining (n+1)/2 rows of TFTs are connected together at a joint which functions as the output end OP3 of the electrostatic protection unit, where n is an odd number greater than 1 and m is positive integer. The input end IP3 of the electrostatic protection unit is connected with the third external terminals 121 and the fourth external terminals 122, and the output end OP3 of the electrostatic protection unit is connected with the common electrode line 123.

The electrostatic protection units in FIG. 8 is different from that in FIG. 6A in terms of the number of rows of forwardly connected TFTs and the number of rows of reversely connected TFTs, and hence is different in terms of endurance on the conductive current. However, the principle of implementing the electrostatic protection by the electrostatic protection unit in FIG. 8 is the same with that in FIG. 6A, and will not be discussed again here.

Figure 9:
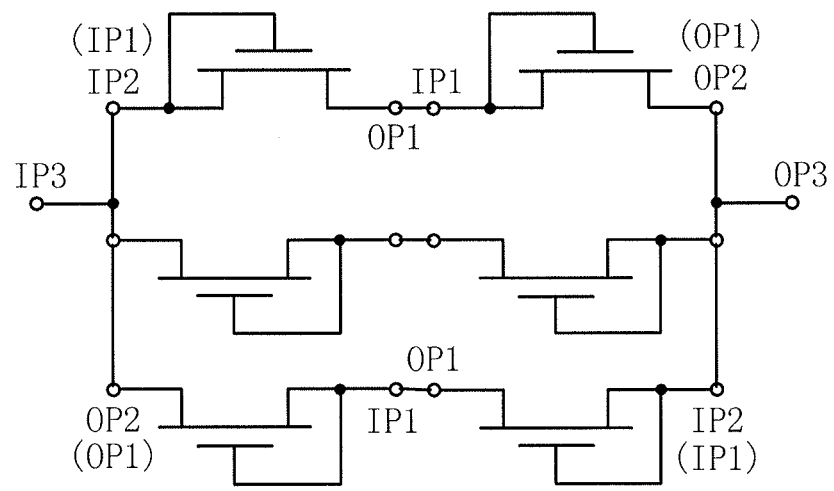
FIG. 9 is a circuit diagram of a specific implementation of the electrostatic protection unit in FIG. 8.

Further, a specific implementation of the electrostatic protection unit in FIG. 8 is given below in connection with FIG. 9. FIG. 9 is a circuit diagram of a specific implementation of the electrostatic protection unit in FIG. 8. Referring to FIG. 8, the electrostatic protection unit includes three rows of TFTs connected in parallel with each other, with each row including two TFTs connected in series.

The input end IP2 of the first row of TFTs and the output ends OP2 of the remaining two rows of TFTs are connected together at a joint which functions as the input end IP3 of the electrostatic protection unit, and output end OP2 of the first row of TFTs and the input ends IP2 of the remaining two rows of TFTs are connected together at a joint which functions as the output end OP3 of the electrostatic protection unit. The input end IP3 of the electrostatic protection unit is connected with the third external terminals 121 and the fourth external terminals 122, and the output end OP3 of the electrostatic protection unit is connected with the common electrode line 123.

Without changing the number of rows of the forwardly connected TFTs and the number of rows of the reversely connected TFTs, positions of the rows of the forwardly connected TFTs relative to positions of the rows of the reversely connected TFTs may be varied in any way in the above electrostatic protection units shown in FIGS. 6A and 7 to 9, obtaining an electrostatic protection unit which has the same principle and function of electrostatic protection with those in FIGS. 6A and 7 to 9.

Further, the TFT array substrate further includes an array of TFTs which has the same main structure with the TFTs of the electrostatic protection unit. Considering that the array of TFTs has a film layer structure, the TFTs of the electrostatic protection unit have the same film layer structure as the array of TFTs array when forming the TFTs of the electrostatic protection unit, which is meant by "the same main structure". This allows the manufacturing process of the TFTs of the electrostatic protection unit to be compatible with the manufacturing process of the array of TFTs, or even the TFTs of the electrostatic protection unit may be formed in the same manufacturing process with the array of TFTs, without causing additional manufacturing steps or costs.

It should be noted that although the TFTs of the electrostatic protection unit and the TFT array may be formed in the same manufacturing process, and the TFTs of the electrostatic protection unit and the TFT array have the same main structure in which the TFTs of the electrostatic protection unit have their gate electrodes to be connected with their source or drain electrodes to form diode structures, the TFTs of the electrostatic protection unit needs to be disposed on a non-display region of the TFT array substrate.

Figure 10:
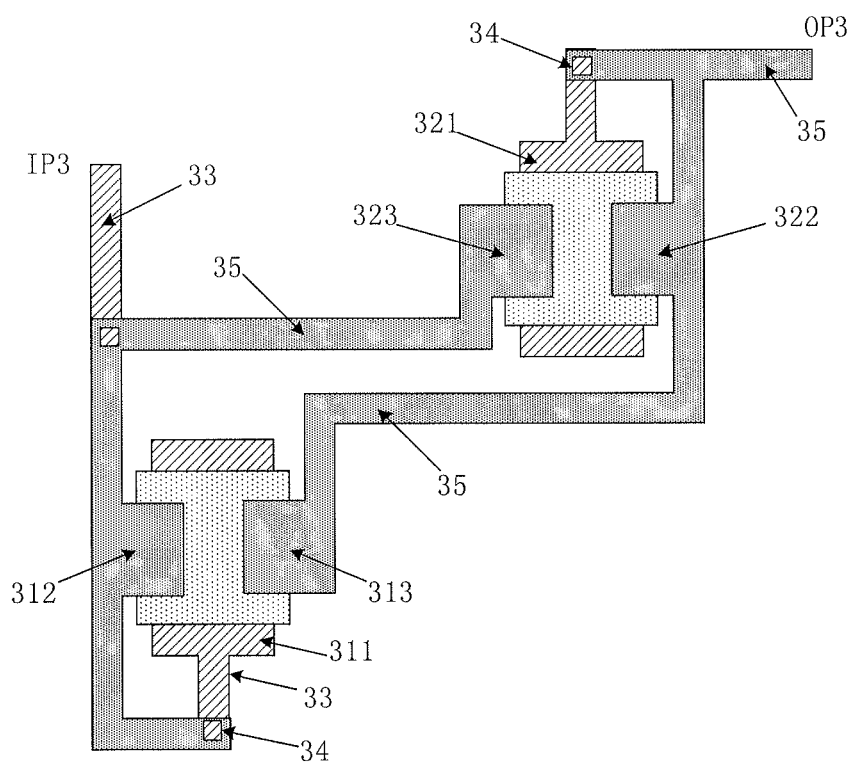
FIG. 10 is a schematic diagram of the TFTs in the electrostatic protection unit according to an embodiment of the present invention.

Further, a specific implementation of the electrostatic protection unit is given below in connection with FIG. 10. FIG. 10 is a schematic diagram of the TFTs in the electrostatic protection unit of the touch display panel according to an embodiment of the present invention. Referring to FIG. 10, the electrostatic protection unit includes a pair of TFTs, where the pair of TFTs includes a first TFT and a second TFT, and the gate electrode 311 of the first TFT, the gate electrode 321 of the second TFT and all the gate electrodes of the array of TFTs on the TFT array substrate are located in a gate layer of the film layer structure of the TFT array, and the drain electrode 312 and source electrode 313 of the first TFT, the drain electrode 322 and source electrode 323 of the second TFT, and all the drain and source electrode of the array of TFTs are located in the drain/source layer of the film layer structure of the TFT array.

The gate electrode 311 of the first TFT is connected with the drain electrode 312 of the first TFT through a gate layer metal wire 33, a via hole 34 located between the gate layer and the source layer, and a source layer metal wire 35 in sequence. The drain electrode 312 of the first TFT is connected with the source electrode 323 of the second TFT through a source layer metal wire 35, and the drain electrode 312 of the first TFT is connected with a gate layer metal wire 33 through the source metal wire 35 as well as the via hole 34 located between the gate layer and the source layer. The gate layer metal wire 33 functions as the input end IP3 of the electrostatic protection unit, and the electrostatic protection unit can be connected with the third external terminals and the fourth external terminals through the gate layer metal wire 33. The source electrode 313 of the first TFT is connected with the drain electrode 322 of the second TFT through the source layer metal wire 35, and the drain electrode 322 of the second TFT is connected with the gate electrode 321 of the second TFT through the source layer metal wire 35, the via hole 34 located between the gate layer and the source layer, and the gate layer metal wire 33 in sequence. The gate electrode 321 of the second TFT is connected with the source layer metal wire 35 through the gate layer metal wire 33 as well as the via hole 34 located between the gate layer and the source layer. The source layer metal wire 35 functions as the output end OP3 of the electrostatic protection unit, and the electrostatic protection unit can be connected with the common electrode line through the source layer metal wire 35.

The specific implementation where the electrostatic protection unit and the TFT array are formed in the same manufacturing process has been described as above. As can be seen, no additional manufacturing step and costs are involved. In addition, when a conductive path is formed in the electrostatic protection unit applied by an electrostatic voltage, the electrostatic protection unit can protect the driving electrodes and the sensing electrodes against electrostatic discharge.

Figure 11:
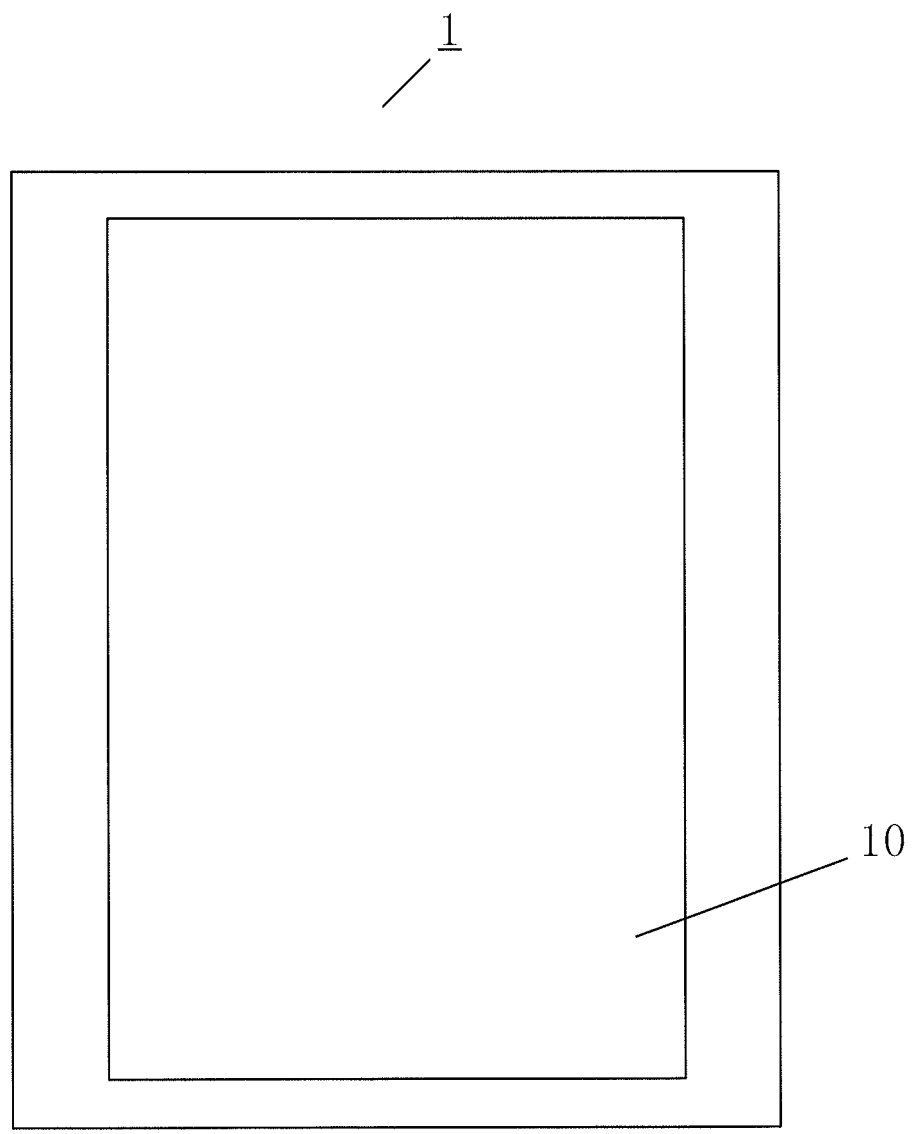
FIG. 11 is a schematic view of the structure of a display device with a touch display panel according to an embodiment of the present invention.

An embodiment of the present invention also provides a display device 1 with a touch display panel. FIG. 11 is a schematic diagram of the structure of a display device with a touch display panel according to an embodiment of the present invention. As shown in FIG. 11, the display device includes the touch display panel 10 described above.

In the touch display panel and the display device with the same as provided by the embodiments of the present invention, the active electrostatic protection unit is provided on the TFT array substrate, the input end of the electrostatic protection unit is connected with the driving electrodes and the sensing electrodes arranged on the color filter substrate, and the output end of the electrostatic protection unit is connected with the common electrode line arranged on the TFT array substrate, to protect the driving electrodes and the sensing electrodes against ESD, thereby improving the yield of the display device with a touch panel.

It should be noted that the preferred embodiments of the present invention and the technical principles used therein are described as above. It should be appreciated by those skilled in the art that the present invention is not limited to the particular embodiments described herein, and any apparent alterations, modification and substitutions can be made by those skilled in the art without departing from the scope of protection of the present invention. Accordingly, while the present invention are described in detail through the above embodiments, the present invention is not limited to the above embodiments and can further include other additional equivalent embodiments without departing from the concept of the present invention. The scope of the present invention should be subject to the appended claims.

What is claimed is:

1. A touch display panel, comprising:
a color filter substrate;
a TFT array substrate disposed opposite to the color filter substrate;
a plurality of driving electrodes and a plurality of sensing electrodes disposed on the color filter substrate and being electrically insulated from each other;
a plurality of driving electrode leads, a plurality of sensing electrode leads, a plurality of first external terminals, and a plurality of second external terminals disposed on the color filter substrate, wherein each of the driving electrodes is connected with one of the first external terminals by a corresponding driving electrode lead, and each of the sensing electrodes is connected with one of the second external terminals by a corresponding sensing electrode lead;
a plurality of third external terminals and a plurality of fourth external terminals disposed on the TFT array substrate, wherein each of the third external terminals is electrically connected with one of the first external terminals, and each of the fourth external terminals is electrically connected with one of the second external terminals;
a common electrode line disposed on the TFT array substrate; and
an electrostatic protection unit disposed on the TFT array substrate and configured to connect the third external terminals and the fourth external terminals with the common electrode line.

2. The touch display panel of claim 1, wherein the plurality of driving electrodes and the plurality of sensing electrodes are located on a first conductive layer.

3. The touch display panel of claim 1, wherein, the plurality of driving electrodes are located on a first conductive layer, the plurality of sensing electrodes are located on a second conductive layer, and an insulating layer is disposed between the first conductive layer and the second conductive layer.

4. The touch display panel of claim 1, wherein the electrostatic protection unit comprises an array of n rows and m columns of TFTs, each row comprising m pairs of TFTs connected in series for a total of n×2 m TFTs, n and m being positive integers,
each pair of TFTs comprising a first TFT and a second TFT connected in parallel with each other and having an input end and an output end, wherein a gate electrode of the first TFT, a drain electrode of the first TFT and a source electrode of the second TFT are connected together at the input end, and a gate electrode of the second TFT, a drain electrode of the second TFT and a source electrode of the first TFT are connected together at the output end;
the input end of each pair of TFTs except the first pair of TFTs in a row is connected with an output end of a preceding pair of TFTs, an input end of the first pair of TFTs is an input end of the row, and the output end of the m-th pair of TFTs in the row is an output end of the row;
input ends of the n rows of TFTs are connected together at an input end of the electrostatic protection unit, and output ends of the n rows of TFTs are connected together at an output end of the electrostatic protection unit; and
the input end of the electrostatic protection unit is connected to the third external terminals and the fourth external terminals, and the output end of the electrostatic protection unit is connected to the common electrode line.

5. The touch display panel of claim 4, wherein the electrostatic protection unit comprises a pair of TFTs comprising a first TFT and a second TFT, a gate electrode of the first TFT, a drain electrode of the first TFT and a source electrode of the second TFT being connected together at the input end of the electrostatic protection unit, and a gate electrode of the second TFT, a drain electrode of the second TFT and a source electrode of the first TFT being connected together at the output end of the electrostatic protection unit.

6. The touch display panel of claim 4, wherein the electrostatic protection unit comprises two pairs of TFTs connected in parallel and having each an input end and an output end, and each of the two pairs of TFTs comprises a first TFT and a second TFT,
wherein a gate electrode of the first TFT, a drain electrode of the first TFT and a source electrode of the second TFT are connected together at the input end of the pair of TFTs, and a gate electrode of the second TFT, a drain electrode of the second TFT and a source electrode of the first TFT are connected together at the output end of the pair of TFTs;
the input ends of the two pairs of TFTs are connected together at the input end of the electrostatic protection unit, and the output ends of the two pairs of TFTs are connected together at the output end of the electrostatic protection unit.

7. The touch display panel of claim 4, wherein the electrostatic protection unit comprises two pairs of TFTs connected in series, and each of the two pairs of TFTs comprises a first TFT and a second TFT;
a gate electrode of the first TFT, a drain electrode of the first TFT and a source electrode of the second TFT are connected together at an input end of the pair of TFTs, and a gate electrode of the second TFT, a drain electrode of the second TFT and a source electrode of the first TFT are connected together at an output end of the pair of TFTs;
the input end of the first pair of TFTs is the input end of the electrostatic protection unit, the output end of the first pair of TFTs is connected to the input end of the second pair of TFTs, and the output end of the second pair of TFTs is the output end of the electrostatic protection unit.

8. The touch display panel of claim 1, wherein the electrostatic protection unit comprises an array of n rows and m columns of TFTs, each row comprising m TFTs connected in series, for a total of n×m TFTs, n being an odd number greater than 1 and m being a positive integer;
a gate electrode and a drain electrode of each TFT are connected at an input end of the TFT, and a source electrode of each TFT is an output end of the TFT;
an input end of each TFT except the first TFT in a row is connected with an output end of a preceding TFT, an input end of the first TFT is an input end of the row, and an output end of an m-th TFT is an output end of the row;
input ends of any (n+1)/2 rows of TFTs and output ends of remaining (n−1)/2 rows of TFTs are connected together at the input end of the electrostatic protection unit, and output ends of the (n+1)/2 rows of TFTs and input ends of said remaining (n−1)/2 rows of TFTs are connected together at the output end of the electrostatic protection unit; and
the input end of the electrostatic protection unit is connected to the third external terminals and the fourth external terminals, and the output end of the electrostatic protection unit is connected to the common electrode line.

9. The touch display panel of claim 8, wherein the electrostatic protection unit comprises three rows of TFTs connected in parallel, each row comprising two TFTs connected in series;
   a gate electrode and a drain electrode of each TFT are connected together at an input end of the TFT, and a source electrode of the TFT is an output end of the TFT;
   in each of the three rows of TFTs, an input end of the first TFT is an input end of the row of TFTs, an output end of the first TFT is connected with an input end of the second TFT, and an output end of the second TFT is an output end of the row of TFTs;
   input ends of any two rows of TFTs and output end of the remaining one row of TFTs are connected together at the input end of the electrostatic protection unit, and output ends of said two rows of TFTs and the input end of said remaining one row of TFTs are connected together at the output end of the electrostatic protection unit.

10. The touch display panel of claim 1, wherein the electrostatic protection unit comprises n rows of TFTs connected in parallel with each other, each row comprising m TFTs connected in series, n being an odd number greater than 1 and m being a positive integer;
    a gate electrode and a drain electrode of each TFT are connected at an input end of the TFT, and a source electrode of each TFT is an output end of the TFT;
    in each of the n rows of TFTs, an input end of each TFT except the first TFT in the row is connected with an output end of a preceding TFT, an input end of the first TFT is an input end of the row of TFTs, and an output end of an m-th TFT is an output end of the row of TFTs;
    input ends of any (n−1)/2 rows of TFTs and output ends of remaining (n+1)12 rows of TFTs are connected together at an input end of the electrostatic protection unit, and output ends of the (n−1)/2 rows of TFTs and input ends of said remaining (n+1)/2 rows of TFTs are connected together at an output end of the electrostatic protection unit; and
    the input end of the electrostatic protection unit is connected to the third external terminals and the fourth external terminals, and the output end of the electrostatic protection unit is connected to the common electrode line.

11. The touch display panel of claim 10, wherein the electrostatic protection unit comprises three rows of TFTs connected in parallel, each row comprising two TFTs connected in series;
    a gate electrode and a drain electrode of each TFT are connected together at an input end of the TFT, and a source electrode of the TFT is an output end of the TFT;
    in each of the three rows of TFTs, an input end of the first TFT is an input end of the row of TFTs, an output end of the first TFT is connected with an input end of the second TFT, and an output end of the second TFT is an output end of the row of TFTs;
    an input end of any row of TFTs and output ends of remaining two rows of TFTs are connected together at the input end of the electrostatic protection unit, and an output end of said any row of TFTs and input ends of said remaining rows of TFTs are connected together at the output end of the electrostatic protection unit.

12. The touch display panel of claim 4, wherein, the TFT array substrate further comprises an array of TFTs, which has a same main structure with the TFTs of the electrostatic protection unit.

13. The touch display panel of claim 1, wherein the first external terminals are electrically connected with the third external terminals by Anisotropic Conductive Films, and the second external terminals are electrically connected with the fourth external terminals by Anisotropic Conductive Films.

14. A display device comprising the touch display panel of claim 1.

15. The touch display panel of claim 8, wherein the TFT array substrate further comprises an array of TFTs, which has a same main structure with the TFTs of the electrostatic protection unit.

16. The touch display panel of claim 10, wherein the TFT array substrate further comprises an array of TFTs, which has a same main structure with the TFTs of the electrostatic protection unit.

* * * * *